INVENTORS
ROLAND W. WAGNER
WILLIAM B. DULANEY
BY
ATTORNEYS

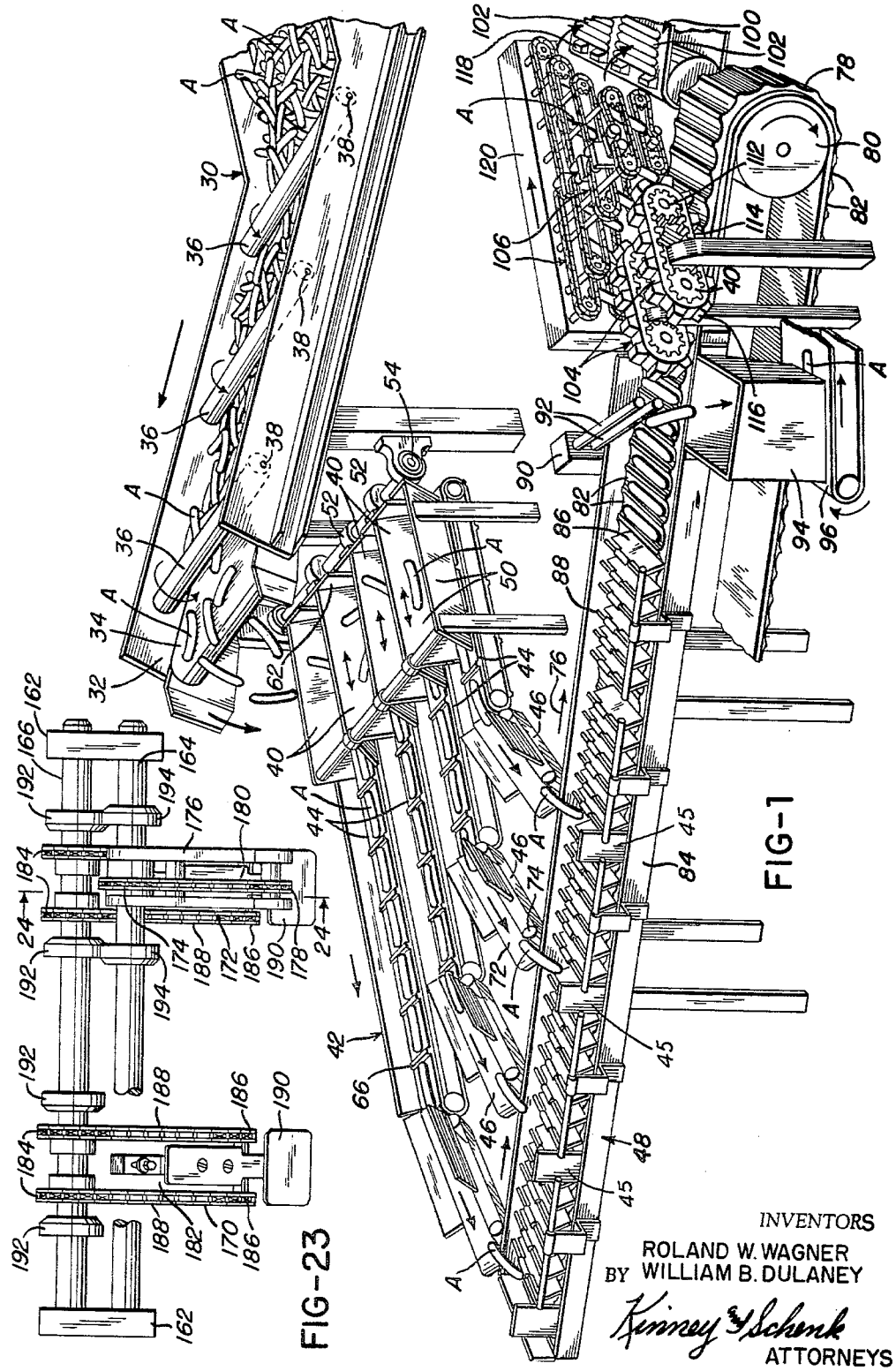

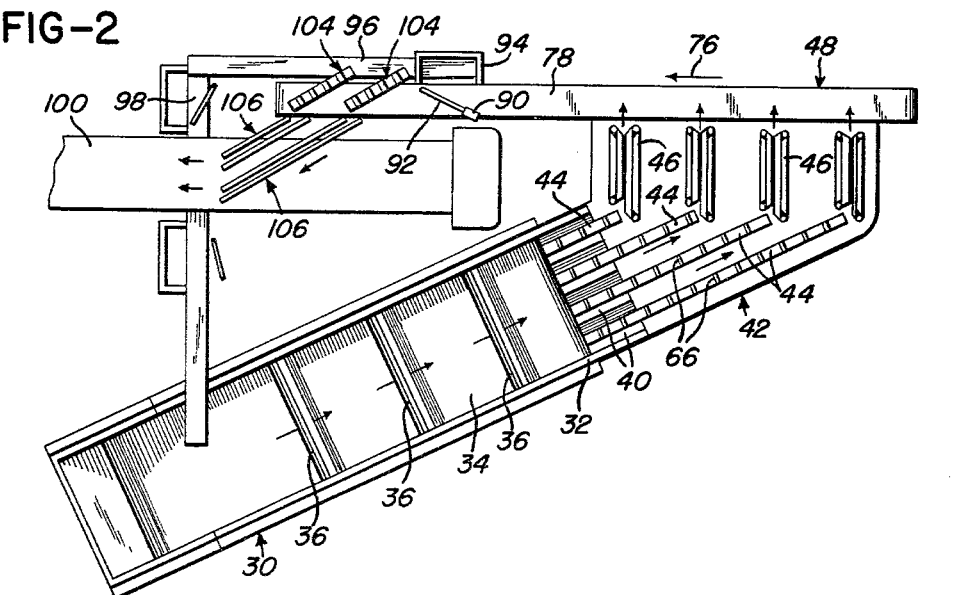
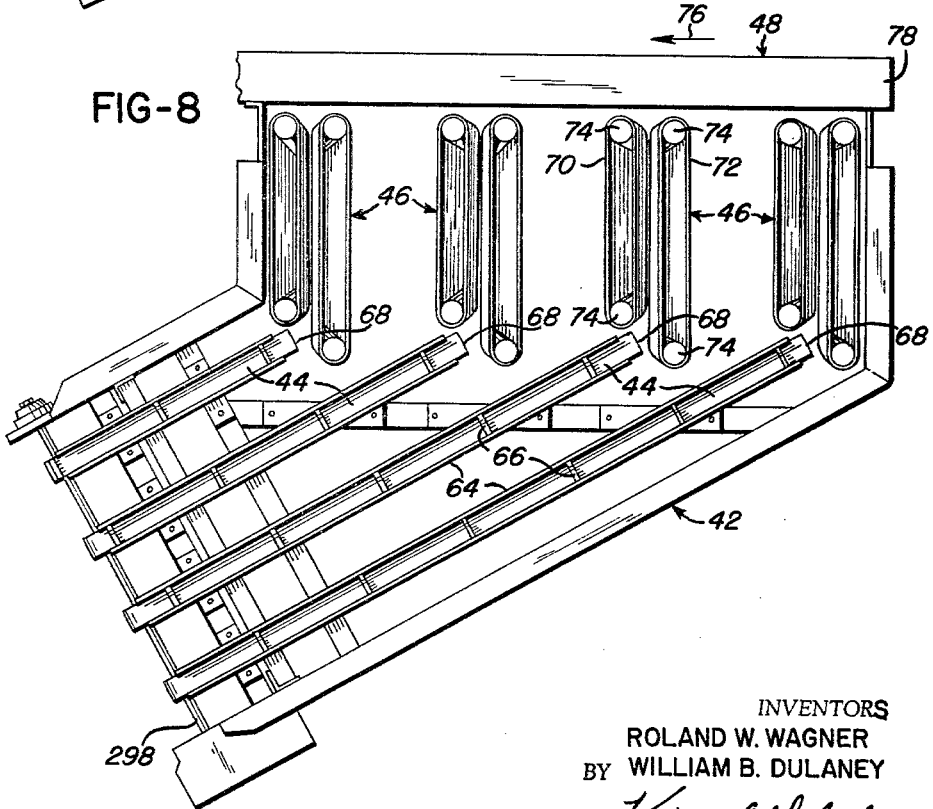

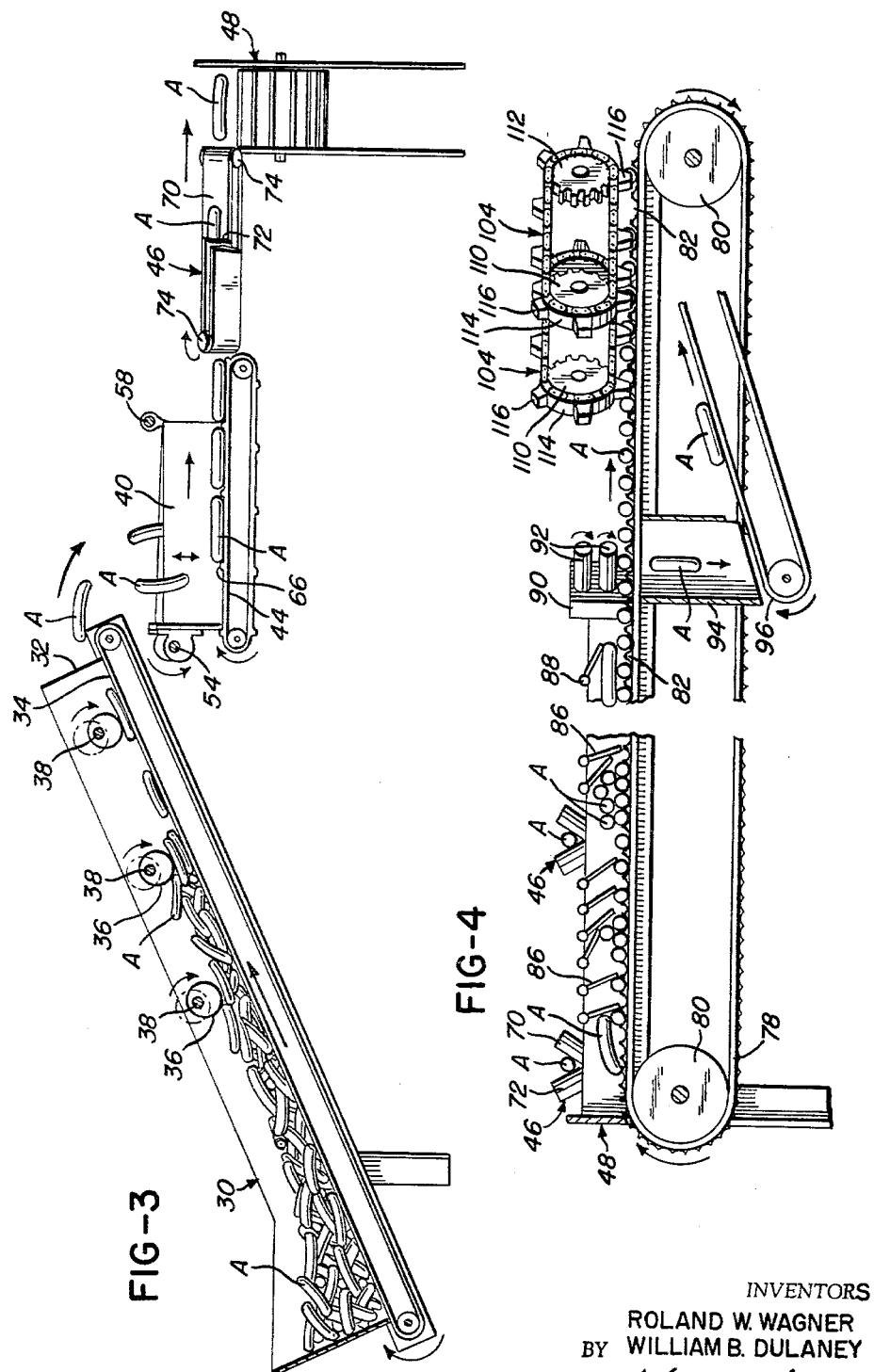

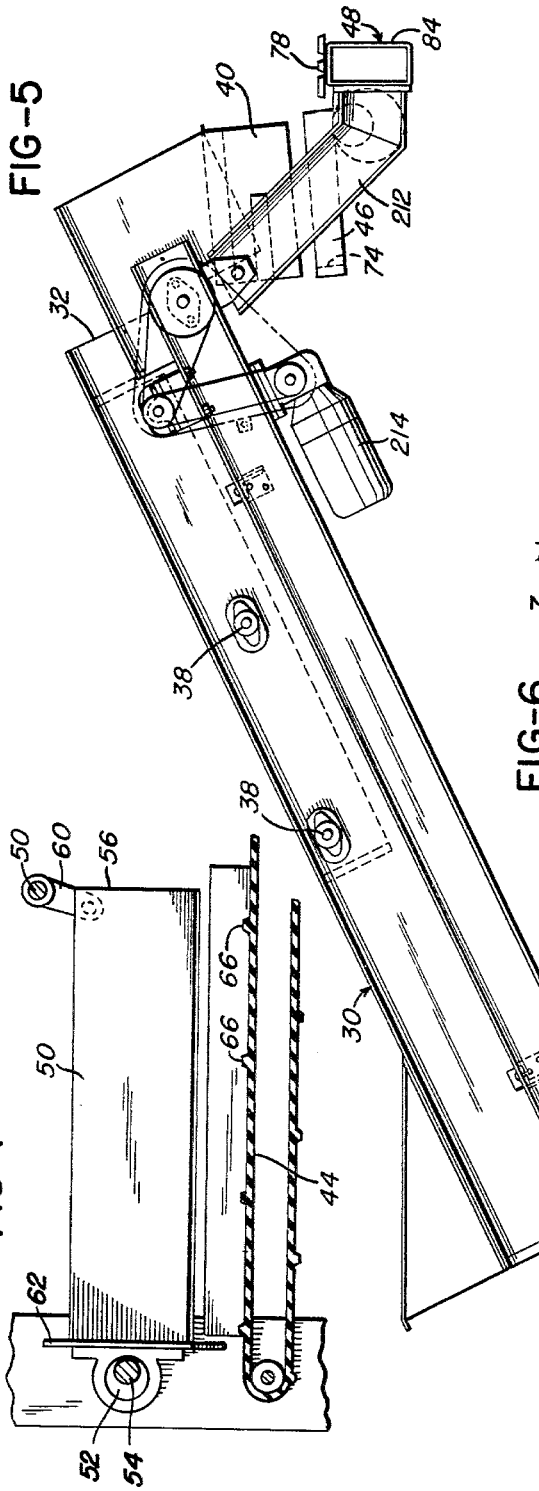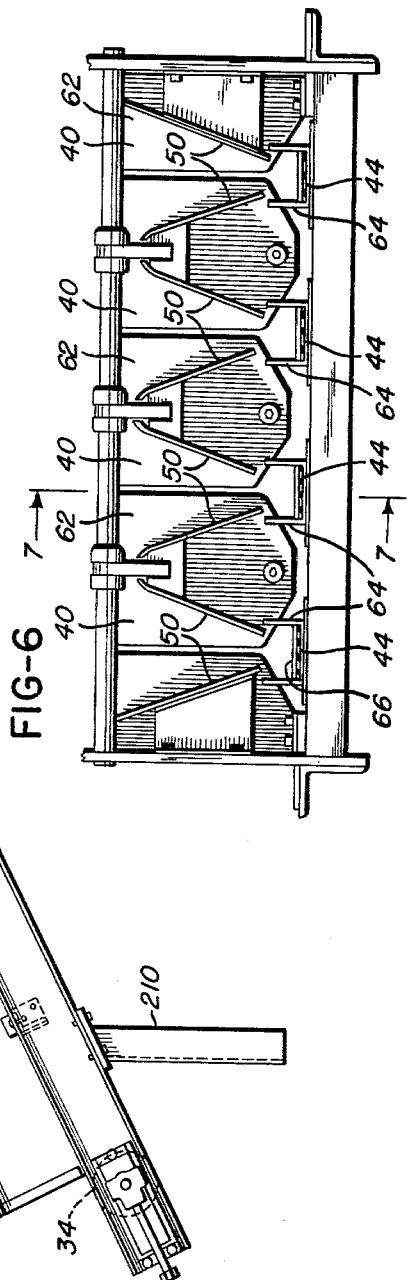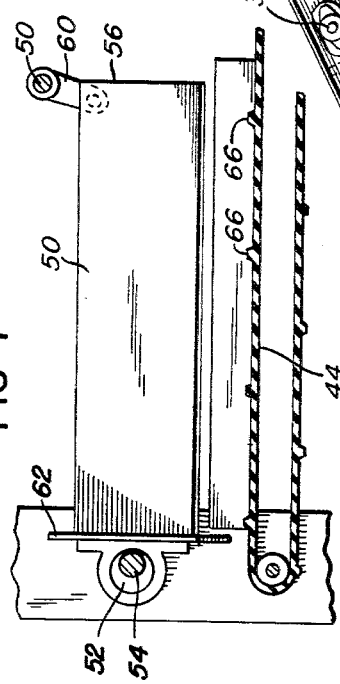

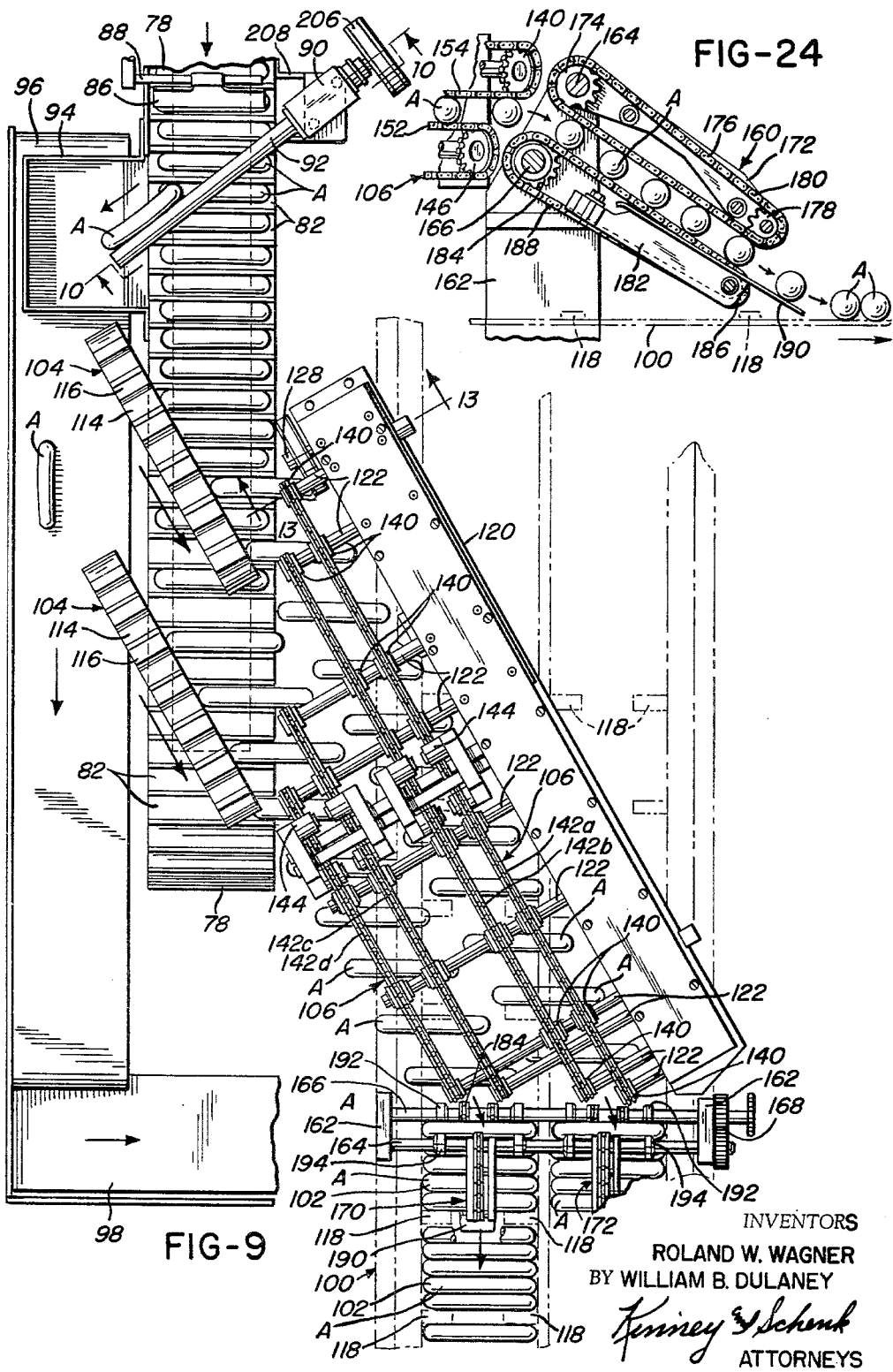

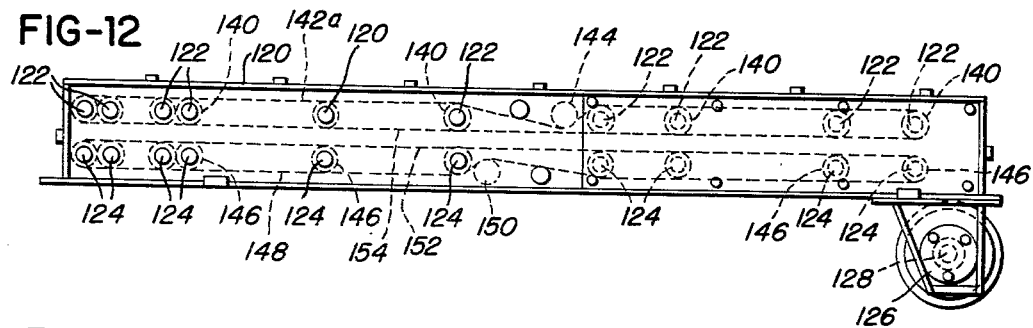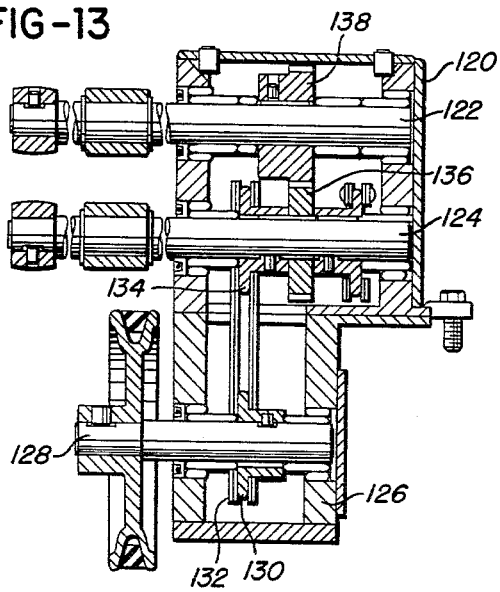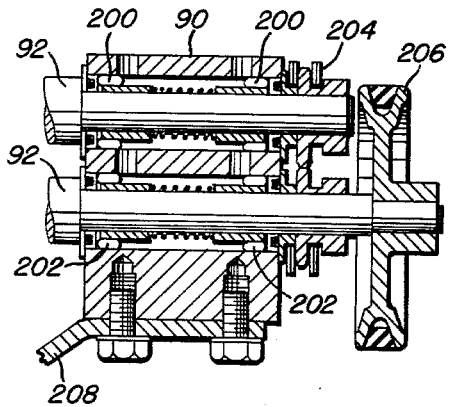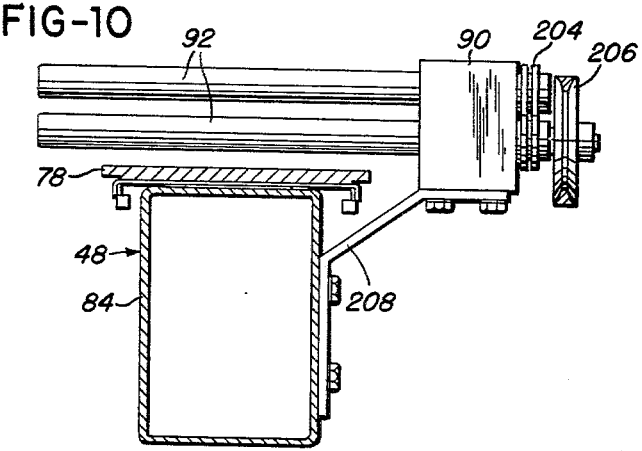

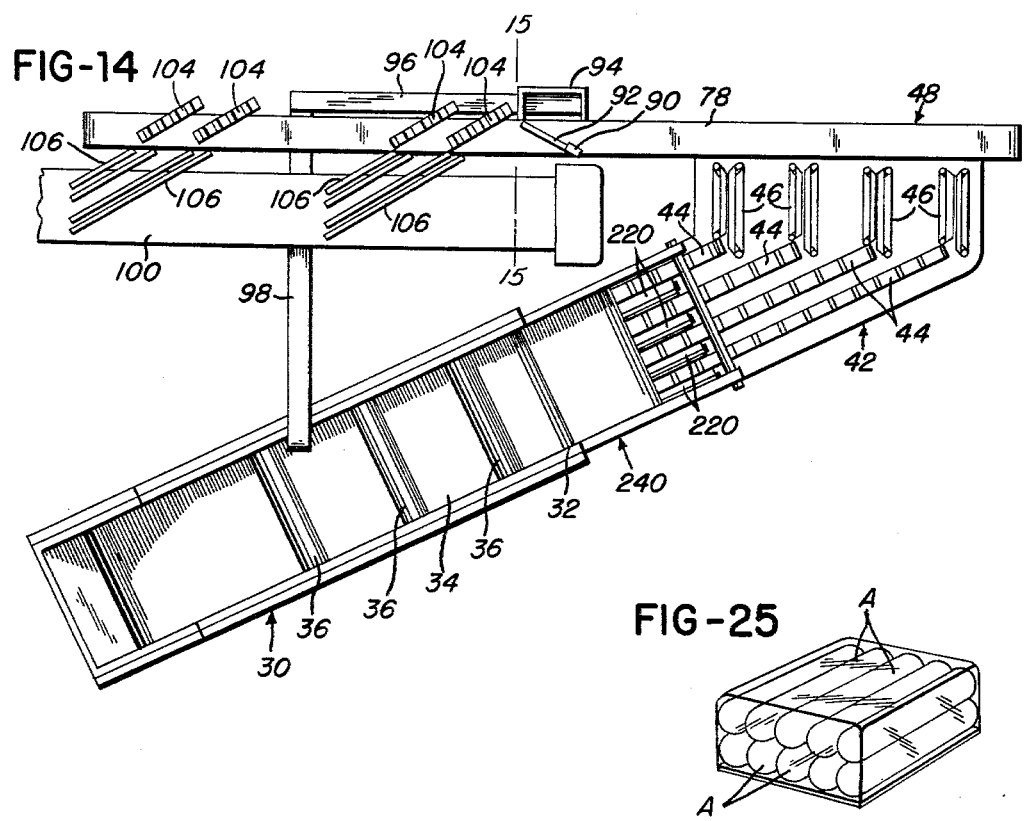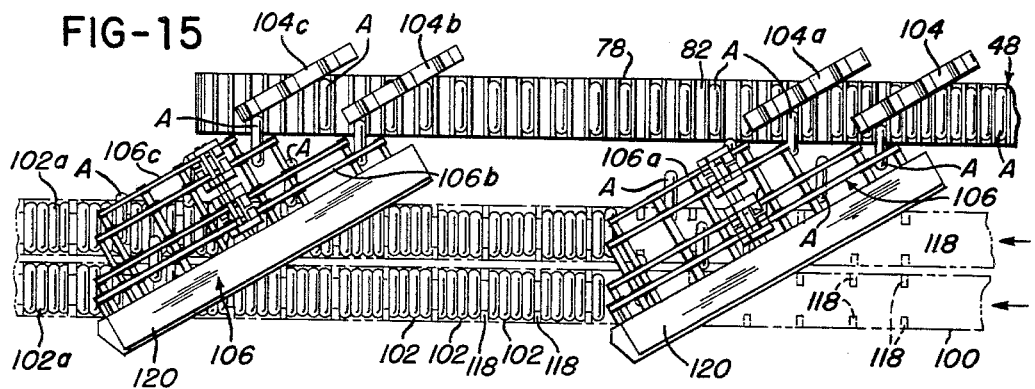

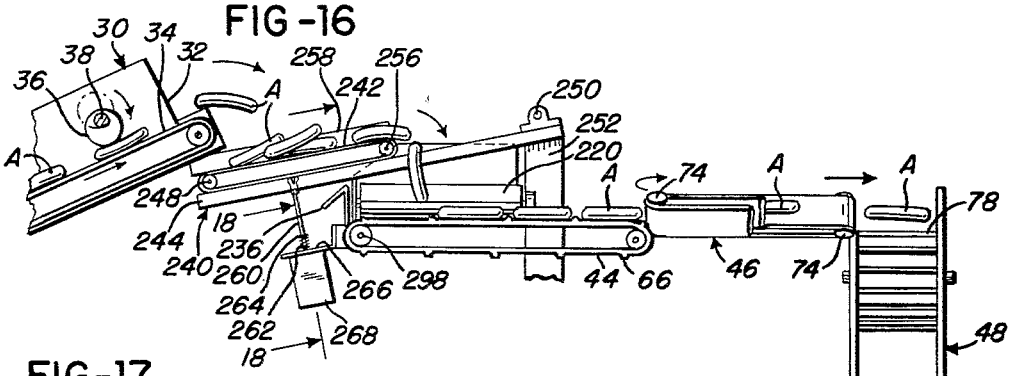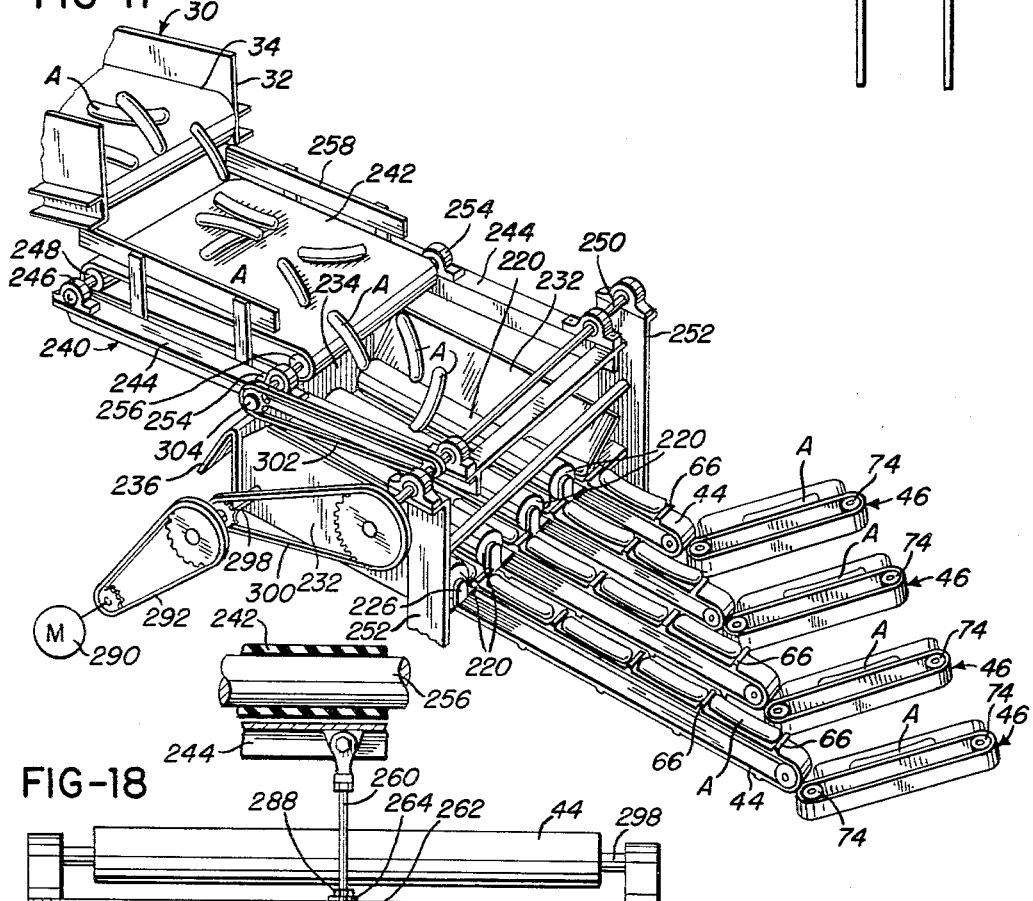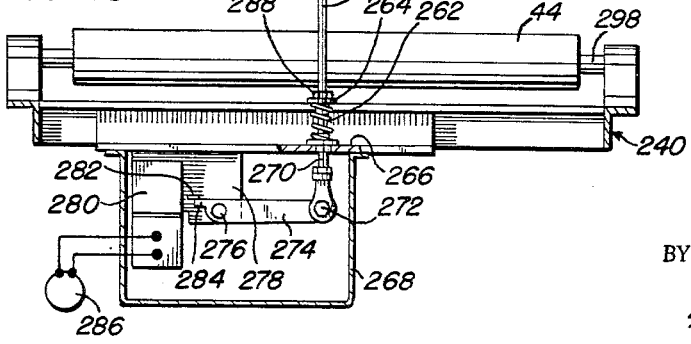

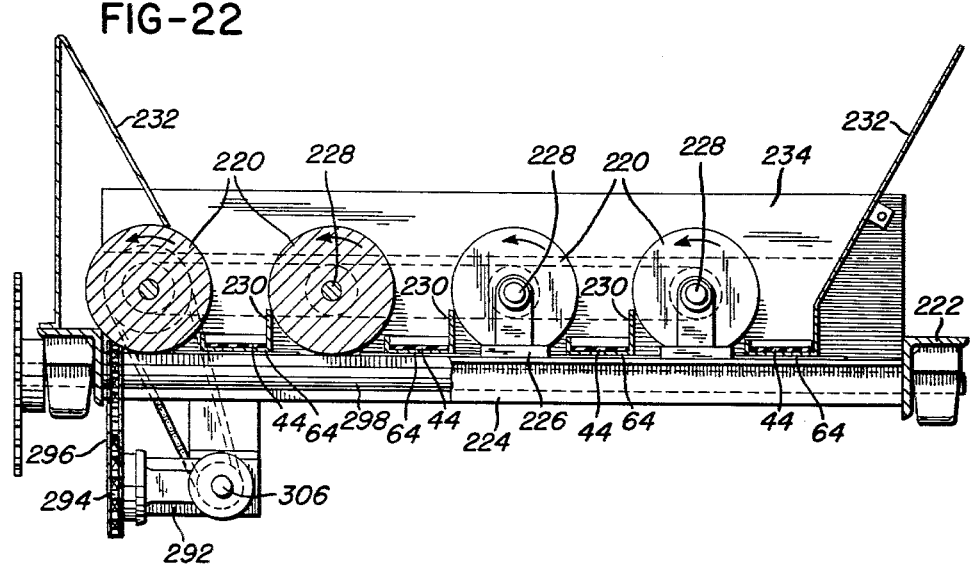
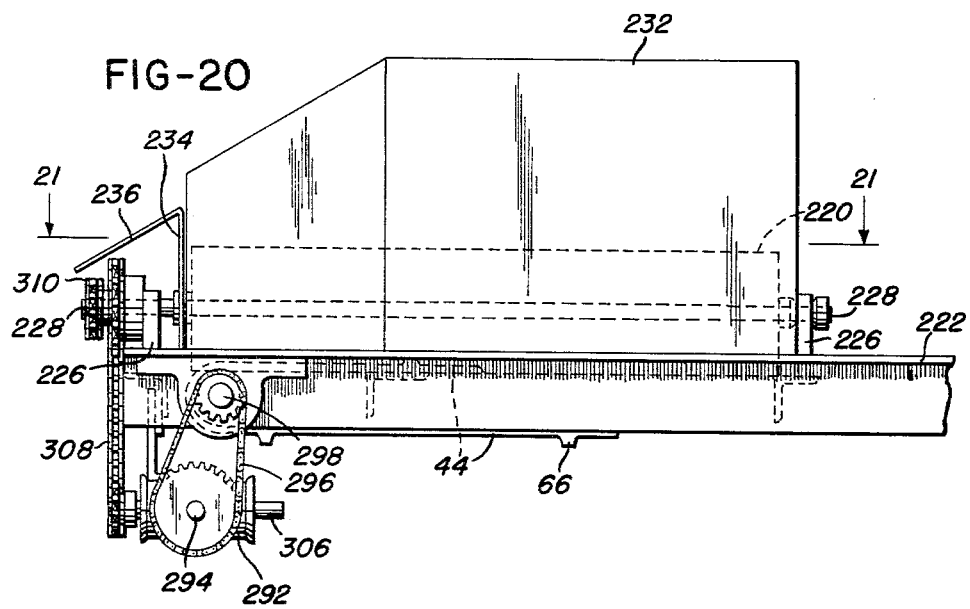

United States Patent Office 3,250,372
Patented May 10, 1966

1

3,250,372
APPARATUS FOR ORGANIZING AND DELIVERING SIMILAR ELONGATE ARTICLES INITIALLY FILED IN RANDOM DISORDER
Roland W. Wagner and William B. Dulaney, Cincinnati, Ohio, assignors to Warrick Equipment Corp., Cincinnati, Ohio, a corporation of Ohio
Filed Feb. 12, 1964, Ser. No. 344,355
33 Claims. (Cl. 198—30)

This invention relates to a method of and means for aligning a plurality of similar, elongate articles while transporting or moving said articles from an initial location where they are piled in random misalignment, and of delivering said articles in precise alignment.

Another object of the invention is to provide means for automatically and continuously accumulating a plurality of similar elongate articles in a jumbled, random state of misalignment, and of then imparting a forward motion to said articles while selectively reducing the overall thickness of a pile of such articles for thereby discharging a single layer of articles from said accumulator.

Another object of the invention is to provide simple, yet highly effective, means for receiving individual elongate articles in random misalignment, and of them continuously and automatically aligning said articles with reference to a moving reach of an article conveyor.

Still another object of the invention is to provide means for continuously and automatically advancing similar elongate articles in axial alignment along a path, and of selectively removing articles therefrom in, and according to, a predetermined sequence, and wherein said removed articles are advanced in a new path divergent to the initial path along which said articles were advancing, while maintaining the axes of said articles in parallelism at all times.

Still a further object of the invention is to provide means for continuously and automatically grouping individual elongate articles in side by side alignment, one or two layers thick, and presenting said articles to the input of a conventional wrapping or packaging device.

A further object of the invention is to provide simple, yet highly effective, means for continuously and automatically correlating the operating characteristics of an accumulator conveyor with the quantity of product discharged from the outlet end of said accumulator.

A further object of the invention is to provide simple, yet highly effective means which, by way of example, may be employed in meat packing establishments for continuously and automatically unscrambling disordered mases of similar, elongate articles, such as, by way of example, wieners which have been prepared for final packaging, and of advancing the unscrambled wieners in alignment to the input conveyor of a conventional packaging or wrapping machine.

Still a further object of the invention is to provide simple, yet highly effective means for continuously and automatically aligning the axes of a plurality of similar, elongate articles, as said articles are advanced.

These and other objects are attained by the means described herein and disclosed in the accompanying drawings, in which:

FIG. 1 is a perspective view illustrating means of the present invention by which individual elongate articles are automatically advanced from a jumbled, multi-layer, non-aligned random condition to a condition of precise alignment.

FIG. 2 is a schematic top view of the device, embodying the teachings of the present invention.

FIG. 3 is a schematic side view showing the relationship of an unscrambler with reference to an accumulator and a product collecting conveyor.

FIG. 4 is a side view of the collecting conveyor, diagonal rakes and skew conveyor of FIG. 1.

FIG. 5 is a side view of a product accumulator in modified association with a collecting conveyor.

FIG. 6 is a view of the forward or discharge end of the unscrambler of FIG. 1.

FIG. 7 is a sectional view taken on line 7—7 of FIG. 6.

FIG. 8 is a top view of the conveyors which collectively comprise part of the unscrambler.

FIG. 9 is a top view, on an enlarged scale, of the skew conveyor assembly of the present invention.

FIG. 10 is a sectional view taken on line 10—10 of FIG. 9.

FIG. 11 is a vertical section through gear box 90 of FIG. 10.

FIG. 12 is a side view of the housing of the skew conveyor.

FIG. 13 is a sectional view taken on line 13—13 of FIG. 9.

FIG. 14 is a view similar to FIG. 2 showing two pairs of skew conveyors operatively associated with the product collecting conveyor.

FIG. 15 is a top view of those portions of FIG. 14 to the left of line 15—15 thereof.

FIG. 16 is a diagrammatic side view similar to a portion of FIG. 3 with automatic flow control means interposed between the accumulator and the unscrambler.

FIG. 17 is a perspective view illustrating a modification of the unscrambler mechanism illustrated in FIGS. 1, 3, 6, and 7.

FIG. 18 is a view, partly in section, taken on line 18—18 of FIG. 16.

FIG. 20 is a side view of the unscrambler roll assembly of FIG. 19.

FIG. 22 is a sectional view taken on line 22—22 of FIG. 21.

FIG. 23 is an enlarged detail view of product transfer conveyor of FIG. 9 which receives aligned products from the discharge end of the skew conveyor and deposits them upon the input conveyor of a standard packaging device.

FIG. 24 is a sectional view on line 24—24 of FIG. 23.

FIG. 25 is a perspective view of a package of articles assembled with the aid of the present invention.

Figure 19:
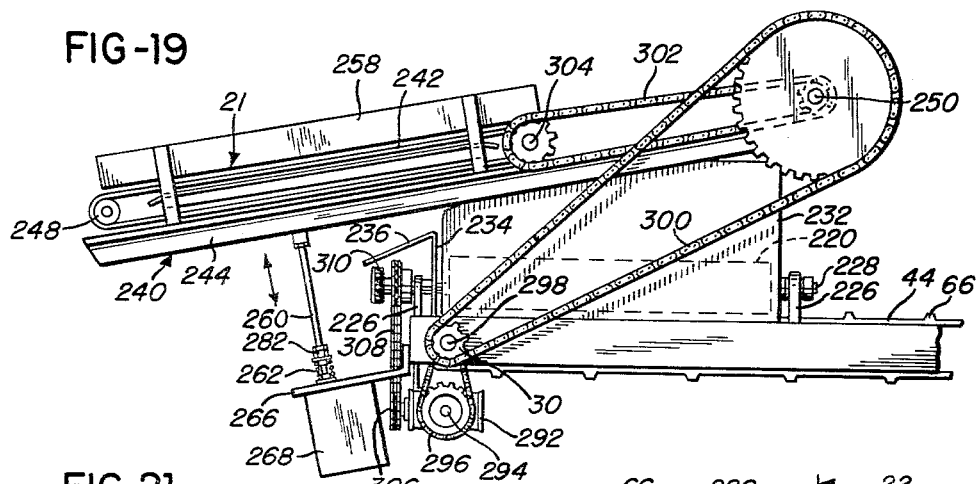
FIG. 19 is an enlarged side view of the drive mechanism of FIG. 17.

With reference to FIG. 1, there is illustrated at 30 a hopper, generally referred to herein as an accumulator, into which is dumped a quantity of elongate substantially similar articles A of stick-like form. Such articles, dumped into the accumulator in disorder as shown, are to be rearranged or unscrambled by the means of the present invention, and oriented to parallel relationship in identical groups in preparation for wrapping or packaging, for example as shown in FIG. 25.

Articles A, in the example used herein for explaining the invention, may be sausages or wieners of substantially uniform shape and size. It should be understood, however, that articles A may be bodies or products other than sausages or wieners, within the purview of the present invention.

Using wieners as the example, it has been common practice to manually arrange and place such articles individually upon the input conveyor of an automatic wrapping or packaging machine, which delivered them in commercial packages for sale. The manual labor involved was not only expensive, but slow and fatigueing as well, due to the monotonous routine of the work required to continuously feed the packaging machinery. The nature of the work has been greatly modified and facilitated by the present invention, resulting in substantial savings of time, labor and expense.

Accumulator 30 receives articles A in complete disorder, from a sausage skinner or other source of supply. The accumulator may be in the form of a box having an open end 32 from which the articles are discharged as a single layer, that is, with each individual article resting flatwise upon the box bottom. To accomplish this, the bottom is constituted of an endless conveyor belt, whose inclined upper reach 34 directs the articles toward discharge end 32, while a series of driven rollers 36 operate to kick back, toward the hopper end of the box, any articles which might overlie those articles which rest flatwise upon the moving belt.

Rollers 36 are supported horizontally above the belt 34, and may be eccentrically journalled at 38 in the sides of the accumulator box, intermediate the ends thereof. The eccentric rollers 36 while rotating, approach belt 34 no closer than is necessary to clear those articles A which lie flatwise upon the belt. Thus, any overlying articles will be kicked back by rotating rollers 36, until they assume flat positions permitting their passage beneath that roller which is closest to discharge area 32.

As FIG. 3 readily suggests, that roller 36 which is closest to discharge area 32, has a minimum clearance with belt 34 which approximates or very slightly exceeds the thickness of an article A, whereas the rollers located closer to the hopper end of the accumulator clear the belt at progressively greater distances. Thus, the roller 36 which is closest to the hopper end of the accumulator, may permit passage of articles A in several layers, while kicking back toward the hopper end any excessive compilation. The middle roller 36, in order to further reduce the article layers, may sweep over the belt with a clearance which is of an intermediate value, so as to pass articles A in not more than two layers of depth, any excess being kicked back toward the hopper end. By the time the articles reach the roller at discharge area 32, the number of layers of articles has been reduced to two or less, and said rollers performs to further reduce the layer to one only.

If desired, the shafts 38 of rollers 36 may be adjustably located at different distances above belt 34, to render the accumulator operative upon articles of different diametral dimensions.

As articles A approach the discharge end of the accumulator, they form a single layer free of the compilation existing at the opposite end of the accumulator, and may therefore drop separately into any of the aligning bins 40 of the unscrambler denoted generally by reference character 42.

The unscrambler may include the several bins 40; belts 44 to convey articles from the bins; and launchers 46 adapted to project articles A from belts 44 onto a collecting conveyor 48. The bins, according to FIGS. 1, 6 and 7, may comprise a series of sloping side walls 50 arranged to guide articles A onto the upper reaches of belts 44, as the articles drop into the bins from the discharge end of the accumulator.

The bin structure may be vibrated to assist in aligning articles A upon belts 44, and vibratory movement of the bins may be effected in any suitable manner, as by means of one or more eccentrics 52 carried by a driven shaft 54 and operative to reciprocate the bins in unison. The eccentrics may be operative upon one end of the bin assembly, while the opposite end 56 is suspended from fixed shaft 58 by swing links 60, FIG. 7.

The rear ends of the bins 40 are closed by plates 62, while the forward ends thereof are open to admit belts 44. These belts are supported in U-channels 64, and the outer faces of the belts carry transverse ribs 66 which are equally spaced apart a distance somewhat greater than the length of articles A. The upper reaches of belts 44 move in a direction away from the accumulator and the ribs 66 thereof pluck the articles A from the bins in succession, with the articles axially aligned upon the belts. All belts 44 are driven continuously at one speed, and as FIGS. 1, 2 and 8 indicate, adjacent belts 44 may be of progressively greater lengths. The purpose of this is to change the direction of article flow so as to conserve installation space, as will become apparent.

At the delivery end 68 of each belt 44 is located an article launcher 46 (FIG. 8), each launcher comprising a pair of endless belts 70 and 72 supported upon spools 74. The spools are so arranged that the innermost reaches of belts 70 and 72 form an elongate valley, or V-groove, receptive of articles A delivered by belts 44. The launcher belts are motor driven, with the inner reaches thereof moving in a common direction, toward the collecting conveyor 48, so that articles fed to the launchers by belts 44 are promptly projected thereby onto collecting conveyor 48, FIG. 1. The projected articles land upon conveyor 48 at right angles to the direction of conveyor 48 at right angles to the direction of conveyor advancement, indicated by arrow 76, and are stopped by end plates 45.

It may be noted, especially with reference to FIG. 2, that the belts 44 of unscrambler 42 may, if desired, be extended toward the collecting conveyor 47 at an acute angle, with the belts of these elements traveling substantially in opposite directions. Such disposition of the belts may be resorted to for conserving floor space when necessary this being of advantage in providing a compact installation of minimum length. By angling the launchers at an obtuse angle to belts 44, and at right angles to conveyor 48, a reversal of article movement is effectively accomplished. Noting FIG. 8, it is readily appreciated that each launcher belt 72 might advantageously be made longer than its cooperating belt 70, to ensure interception and prompt advancement of any articles delivered by belts 44.

With reference now to FIGS. 1 and 4, the article collecting conveyor may be described as follows. Said conveyor includes an endless belt 78 trained over a pair of rolls 80, 80, one of which rolls is motor driven. Belt 78 has its outer face provided with a multiplicity of parallel transverse grooves 82, each of a length somewhat in excess of the overall length of an article A. The upper reach of belt 78 moves continuously in the direction of arrow 76.

Launchers 46 are arranged to feed articles A in succession, to the grooves 82 of belt 78, at a rate approximating or slightly exceeding the capacity of grooves 82 to receive the articles, the object being to ultimately charge each groove with one such article.

In the region of launchers 46, the frame 84 of the article collecting conveyor may be provided with a succession of freely swinging depending gates 86 arranged transversely of and above said conveyor. The gates may be suspending from horizontal pivot shafts 88 supported upon the frame, and the lower ends of the gates nearly reach the belt 78. The gates serve as spreaders for articles projected onto belt 78 by the launchers, so that every groove 82 will be charged with an article as the belt advances, provided of course, that the launchers feed articles at a proper rate. In practice, the launchers feed articles slightly in excess of the ability of the grooves to accommodate them, and any article in excess are removed from belt 78 by a kicker 90 located beyond the gate section.

Kicker 90 may comprise one or more rotating parallel rods 92 which span belt 78 at an angle, the rods being rotated in a direction such as to roll excess articles in a direction counter to the belt advancement. The lowermost rod permits passage of all articles A which are properly nested in belt grooves 82, but will kick from the belt any articles lying atop or between the nested articles. Action of the kicker is clearly indicated, upon FIGS. 1 and 4.

Any articles removed from the belt by kicker rods 92, may enter a chute 94 which feeds the excess articles onto a conveyor 96, which conveyor may dispose of the excess articles in any suitable manner. As FIG. 2 suggets, the excess articles may be transferred to a cross-conveyor 98 which returns them to accumulator 30, or presents them to an attendant for disposition otherwise.

Articles A which pass the kicker elements 92 are now found arranged upon belt 78 in parallelism, single file, and uniformly spaced apart within belt grooves 82. To arrange the articles for acceptance by automatic wrapping or packaging machinery, the articles may require grouping upon a terminal conveyor 100, preferably in two rows. Each group 102 may comprise a given number of articles A, for example five to a group, the five articles of a group being parallel and contacting one another to form a single layer of articles upon conveyor 100. A group, in the alternative, may be required to contain a greater number of articles A, for example ten articles, in which event the articles of a group may be arranged in two layers upon conveyor 100, with five articles forming each layer, and one layer being superimposed upon the other. The single layer grouping of five articles will be treated first, in the following explanation.

Reference is made to FIGS. 1, 2, 4 and 9 concerning the grouping of articles upon terminal conveyor 100, the understanding being that conveyor 100 feeds groups of articles A to a conventional wrapping or packaging machine, and may be a part of such machine providing for input. In the general view, FIG. 2 each reference character 104 indicates an article deflector, the purpose of which is to push articles A obliquely from the grooves 82 of belt 78, while maintaining the parallel relationship of articles A, and to deliver such articles to a pair of skew conveyors denoted generally by reference characters 106; the skew conveyors maintaining the parallel relationship of articles A and finally depositing them upon terminal conveyor 100 in groups as indicated at 102, 102, of FIG. 1.

The deflectors 104 are identical, and may be described as follows. Deflector 104 may comprise a pair of spaced parallel sprockets 110 and 112, one of which is driven; and trained about these sprockets is a positive drive flexible belt or chain 114. Chain 114 carries outwardly extending lugs or fingers 116 which are equally spaced apart upon the chain. The fingers on the lower reach of chain 114 are adapted to sweep the grooves 82 of belt 78, and push the articles A lengthwise from the grooves while belt 78 continues to advance. As articles A are so moved by the fingers off one side of belt 78, the articles the grasped by a skew conveyor 106 which carries them, still in parallelism, to terminal conveyor 100 whereon the articles are deposited to form groups 102. Conveyor 100 may be of sufficient width to accommodate two parallel lines of article groups, as FIG. 1 indicates, and it will be understood that of the two skew conveyors 106 feeds a line of groups upon conveyor 100.

Terminal conveyor 100, as best shown in FIGS. 1 and 9, carries pairs of upstanding lugs 118 disposed throughout the length of the conveyor, said pairs of lugs being spaced to accommodate the groups 102 af articles A, and keep the groups separated while in transport to the wrapping or packaging machine fed by conveyor 100.

The skew conveyor assembly is best understood by referring to FIGS. 12 and 13. It comprises an elongate housing 120 which supports for rotation an upper level of sprocket shafts 122, and a lower level of sprocket shafts 124. The shafts are all parallel to one another, and extend laterally from housing 120. At one end of the housing is a bracket 126 supporting a drive shaft 128. This shaft carries a sprocket 130 which by means of chain 132 drives a sprocket 134 fixed upon the closest shaft 124 of the skew conveyor. By means of meshing gears 136 and 138, fixed respectively upon the closest shafts 124 and 122, these shafts are rotated in opposite directions.

Outside the limits of housing 120, all of the upper-level shafts 122 carry fixed sprockets 140 of equal size (FIG. 9), which support the long endless chains 142a, 142b, 142c, and 142d. On FIG. 12 is indicated a tensioning sprocket 144, such as may be applied to each chain.

Similarly, outside the limits of housing 120, all of the lower-level shafts 124 carry fixed sprockets 146 of equal size, supporting lower chains 148 each provided with a tensioning sprocket 150.

As is best understood from FIG. 12, the upper reach 152 of one chain is spaced in parallelism from the lower reach 154 of the other chain, and this space is gauged to receive articles A in the manner of FIG. 24. As the chain reaches 152 and 154 move in a common direction, and at equal rates of speed, articles A will be conveyed thereby bodily from conveyor 78 (FIG. 9) to conveyor 100, which is offset therefrom. FIG. 9 shows how deflectors 104 act upon articles A to move them laterally off the conveyor 78, and into the throats of skew conveyors 106, the throats being the spaces between the lower reaches of the upper chains and the upper reaches of the lower chains, FIG. 12.

As FIG. 9 indicates, the skew conveyor housing 120 and all its conveyor chains, extend at an acute angle to conveyor 78, in order to accept articles A on a skew as said articles are moved lengthwise off the conveyor 78 by deflectors 104, 104. This of course necessitates the use of progressively shorter skew conveyor chains in a direction away from housing 120.

Again referring to FIG. 9, it will be noted that the deflector 104 which is closest to kicker 90, performs to dislodge from conveyor 78 every other article A, that is, alternate ones thereof, so that the articles remaining on conveyor 78 may be dislodged by the second deflector 104, said second deflector being the one farthest from kicker 90. This result is achieved by properly spacing the deflector lugs 116 from one another, and advancing them at a required rate of speed with relation to the linear speed of conveyor 78. It will be noted that conveyor 78 is completely cleared of articles A beyond the second deflector 104. It will be noted also that every article A dislodged from conveyor 78 retains its parallel relationship to grooves 82 and to one another, in transfer to terminal conveyor 100 by way of skew conveyors 106, 106.

Referring to skew conveyor chains 142a, 142b, 142c and 142d, it should be understood that beneath each of these chains there is located an identical lower chain cooperating to hold and advance the articles A toward terminal conveyor 100. The manner of delivery is illustrated by FIG. 24.

In FIGS. 24 and 23 is depicted an article delivery device 160, which may be employed to place upon terminal conveyor 100 the articles released by skew conveyors 106, 106. As was previously mentioned herein, articles leaving the skew conveyors are to be arranged upon terminal conveyor 100 in groups, and in two rows (FIG. 9). The groups are confined by upstanding lugs 118 carried by conveyor 100, with the individual articles of each group contacting one another in parallelism.

Device 160 may comprise standards 162 supporting two horizontal shafts 164 and 166, rotated in opposite directions by gearing 168. Said shafts have associated therewith two identical conveyor units denoted 170 and 172, arranged to deliver articles to the duplicate rows upon conveyor 100. Since units 170 and 172 are identical, a description of one should suffice for the other also. The upper shaft 164 carries a fixed sprocket 174, and supports one end of a frame 176 which flanks the sprocket. The opposite end of frame 176 carries an idle sprocket 178, and trained about the two sprockets is an endless chain 180. Shaft 164 rotates relative to frame 176, and drives chain 180 in the direction necessary to advance articles A toward terminal conveyor 100.

The lower shaft 166 in like manner supports a subjacent frame 182, and carries a pair of spaced sprockets 184, 184, fixed thereon. The free or forward end of frame 182 carries a pair of idler sprockets 186, 186, which are spaced apart in correspondency with sprockets 184, 184. Each set of sprockets 184–186 carries an endless chain, and these chains are designated 188, 188. As shaft 166 rotates, it drives chains 188, 188 in the direction necessary to advance articles A toward terminal conveyor 100.

By referring to FIG. 24, it is clearly apparent that chains 180 and 188 have inner reaches spaced apart throughout the length thereof, to embrace and convey articles A, from the skew conveyor downwardly to terminal conveyor 100. Frame 182 may carry an inclined plate 190, which projects beyond the free end of said frame. The projecting portion of plate 190 may rest upon conveyor 100, or may closely approach said conveyor, for the purpose of guiding articles A gently onto said conveyor when released by conveyor chains 180, 188.

As FIG. 9 indicates, plate 190 is of limited width, so as to extend between the upstanding lugs 118, 118 of conveyor 100 without offering any obstruction to lug advancement. Also, the width of plate 190 is less than the length of an article A; in fact, the width of an entire unit 170 is less than the length of an article A, preferably.

In view of the narrow width of units 170, 172, with relation to the length of articles A, means are provided to ensure against any tendency of the articles to enter said units in a cocked or disarrayed condition. Such means may comprise pairs of circular collars 192—192 and 194—194, fixed respectively on shafts 166 and 164, the collars 192—192 being aligned with collars 194—194 and spaced therefrom to accommodate snugly between them the articles advanced thereto by the skew conveyors. The collars being spaced apart on shafts 164 and 166 a distance substantially greater than the span of sprockets 184, 184, perform as stabilizing elements to start the articles horizontally into the bight of chains 180, 188. The collars do not appear on shafts 164 and 166 of FIG. 24 as they are hidden by sprockets 174 and 184; however, the collars would be of approximately the same diameter as the full diameters of the sprockets.

From the foregoing explanation, it is evident that article A fed from skew conveyors 106 to the delivery devices 160, will be deposited upon terminal conveyor 100, between successive lugs 118 thereof, as a single layer with the articles grouped for presentation to the wrapping or packaging machine fed by conveyor 100.

It may sometimes be considered advantageous to deposit upon terminal conveyor 100, groups of articles A in two layers, one layer atop another, for presentation to the wrapping or packaging machinery. In that event, the structure of FIGS. 14 and 15 would be adopted, wherein are provided four article deflectors 104, and four skew conveyors 106. Articles A will, as before, occupy all the grooves 82 of conveyor 78 as shown at the right in FIG. 15, and will be advanced toward the left. The first article deflector 104 (at the extreme right of FIG. 15), will dislodge every fourth article A from conveyor 78 and feed these to the first skew conveyor 106, which skew conveyor will deposit such articles upon terminal conveyor 100 as previously explained.

The second article deflector, identified as 104a, will dislodge from conveyor 78 the next remaining article A and every fourth one thereafter, and feed these to the second skew conveyor 106a, which in turn, will feed said articles to conveyor 100. The first and second skew conveyors act, like those of FIG. 9, to lay down articles in single layer groups upon conveyor 100, the groups being kept separated by the upstanding lugs 118 of terminal conveyor 100.

The third and fourth article deflectors 104b and 104c, in cooperation with their associated skew conveyors 106b and 106c, will dislodge the remaining articles A from conveyor 78 and deliver them to terminal conveyor 100, atop the first layer established by skew conveyors 104 and 104a, thereby to produce upon conveyor 100 successive groups of two layers each shown at 102a. These two-layer groups are carried by conveyor 100 to the conventional wrapping or packaging machinery, which may deliver the finished package in substantially the wrap depicted by FIG. 25, or some variation thereof.

FIG. 11 is presented to show the drive and bearing arrangement of kicker structure 90. The kicker rods 92, 92, may be journaled in anti-friction bearings 200 and 202 supported in housing 90, and rotation in a common direction may be imparted to the rods by means of a chain and sprocket drive indicated generally by 204. A pulley 206 fixed upon an end of one of the rods 92 transmits rotation to the rods, said pulley being belt-driven by a motor (not shown). A bracket 208 may be employed for mounting the kicker structure upon the housing 84 of the collecting conveyor.

In the early portion of the specification, and with reference to FIG. 1, an explanation in detail was given as to the progress of articles A from the accumulator 30 to the collecting conveyor 48. According to a modification illustrated by FIG. 5, a degree of simplification might be achieved in presenting articles to conveyor 48, provided that the nature of the articles favors the modified procedure. Here in FIG. 5, the unscrambler has been dispensed with, so that articles A leave the discharge end 32 of accumulator 30 in the manner of FIG. 1, and drop into a multiple bin or hopper assembly 40 which may simulate the bin assembly 40 of FIG. 1, or that of FIG. 22 later to be described. From bin 40, the articles drop directly onto launchers 46 similar to those shown at 46 of FIG. 1, which project the articles onto collecting conveyor 48.

The bin structure 40 of FIG. 5 may or may not be vibratory, depending upon the nature of consistency of articles A. Its function is to orient all articles delivered by accumulator 30, to the direction of travel of the belts of launchers 46 so that the launchers will project the articles lengthwise onto conveyor 48, as in FIG. 1. In FIG. 5, 210 and 212 denote supporting frame elements whereby the assembly may be operatively related to frame 84 of collecting conveyor 48. Frame element 212 may support the bin structure 40 and the several launchers 46. An electric motor 214 may furnish the necessary power for driving the eccentric rollers shafts 38 and the conveyor belt 34 of the accumulator. The same may drive the launcher belt spools 74, and the vibrating mechanism for bins 40, if desired.

A modification of the unscrambler is illustrated by FIGS. 14, 16, 17 and 19 through 22. Instead of utilizing vibrating bins such as 40, a battery of rotating rolls 220 performs to orient articles A lengthwise to the direction of travel of belts 44. Rolls 220 are referred to as rotary unscramblers, and will by preference, though not of necessity, agree in number with the number of belts 44 feeding the article launchers 46. FIG. 22 shows the belts 44 and their relationship to unscrambler rolls 220.

The rotary unscrambler may include a frame 222 having cross members 224 upon which are secured the bearing boxes 226, said bearing boxes supporting opposite ends of roll shafts 228. The roll shafts are parallel to one another, and are spaced apart a distance such that the space between the peripheries of rolls 220 exceeds the diameter of articles A.

Belts 44 which carry the articles from rolls 220, are disposed alongside said rolls beneath the level of shafts 228, and the upper reaches of the belts travel in elongate channels 64 corresponding to the similarly numbered channels of FIG. 8. Channels 64 in the vicinity of rolls 220, have each an extended upright leg 230 which nearly contacts a roll periphery slightly beneath the level of roll shafts 228, this being for the purpose of guiding articles A onto belts 44 without the likelihood of pinching the articles between the rolls and the channels. The rolls in FIG. 22 rotate counter-clockwise, at a common rate of speed.

Side walls 232 on the unscrambler frame confine the articles fed to rolls 220, and ensure deposit thereof upon belts 44. The side wall to the left on FIG. 22 may overlie the adjacent roll 220 to preclude climbing of articles onto the top of said roll and remaining there as the roll rotates. The frame may carry also an upright rear wall 234, having a top margin turned outwardly at 236 as a gearing guard, FIGS. 19 and 20.

From the foregoing explanation, and with reference to FIG. 17, it will be understood that articles A dropped into the unscrambler, will fall upon rotating rolls 220 and eventually become aligned upon belts 44, for transmission lengthwise to one or another of the launchers 46. As will be explained, the flow of articles to rolls 220 should preferably be controlled, to avoid choking of the unscrambler rolls with excess articles.

The flow control mentioned above, may comprise a weighing conveyor 240 including a belt 242 receptive of articles from accumulator 30, and arranged to deliver such articles to the unscrambler rolls. The weighing conveyor is responsive to the weight of articles A deposited thereon by accumulator 30, for controlling output of the accumulator as will be explained.

The weighing conveyor may include a pair of spaced parallel frame members 244, carrying at their rear ends a pair of bearing blocks 246 rotatably supporting a conveyor roll 248 for belt 242. At the opposite ends thereof, frame members 244 are pivoted upon a shaft 250 carried by uprights 252 of the unscrambler framework. Intermediate the ends of frame members 244, may be fixed a pair of bearing blocks 254 for supporting the forward roll 256 of belt 242. From the foregoing, it will be understood that weighing conveyor 240 may rock upon shaft 250, in a vertical plane. Conveyor roll 256 thereof may slightly overhang the rear wall 234 of the unscrambler, to ensure the deposit of articles A upon rolls 220. Side rails 258 keep the articles A from falling off the sides of the belt.

The conveyor belt end of frame 244 may be supported by an upright shaft 260, which is spring loaded by means of a compression spring 262. Opposite ends of the spring may abut a normally fixed washer 264 on shaft 260, and a stationary bracket 264 on the unscrambler frame, so that the weight of any articles upon belt 242 will compress the spring and lower the shaft 260. The extent of lengthwise movement of shaft 260 accordingly will depend upon the amount of weight imposed upon belt 242.

Beneath bracket 266 is a housing 268 into which extends the lower end 270 of shaft 260, where the shaft end is pivoted at 272 upon a rocker arm 274. Arm 274 may be pivoted at 276 upon a stationary support 278. At 280 is indicated a potentiometer having a sliding contactor 282 to be moved by the end 284 of rocker arm 274. The sliding contactor operates to vary an electric current passing through the potentiometer to motor 286, which motor drives the conveyor 34 of accumulator 30, FIG. 18.

With an increase of weight upon weighing conveyor 242, shaft 260 will be lowered to actuate the potentiometer for reducing the speed of motor 286, this resulting in a reduced output of accumulator 30, and consequently, a reduced flow of articles A to the unscrambler rolls 220. As weight of articles upon conveyor 242 is relieved, spring 262 will elevate the frame 244 and consequently the rocker arm 274, thereby causing potentiometer 280 to speed up motor 286 and the output of accumulator belt 34. By this means, there is maintained a controlled flow of articles to the unscrambler rolls 220, preventing overloading of said rolls and the launchers 46 fed thereby. The rate of advancement of weighing conveyor belt 242 need not be varied, as the belt will forward only as many articles as it receives from accumulator 30.

An adjusting means in the form of a nut 288 on shaft 260, may be provided for regulating the force of spring 262, thereby to adjust the potentiometer for effective performance.

A constant speed electric motor 290, FIG. 17, may be employed to drive conveyor belt 242, unscrambler rolls 220, and the conveyor belts 44 delivering articles to launchers 46. The drive may be from motor 290 preferably to a gear box 292 (FIGS. 19 and 20), by way of a chain drive 296 may be carried to shaft 298 which drives a roll that supports conveyor belts 44.

Shaft 298 may drive, by means of sprockets and a chain 300, the shaft 250 which in turn drives a chain 302 transmitting rotation to the shaft 304 of flow control conveyor roll 256.

Figure 21:
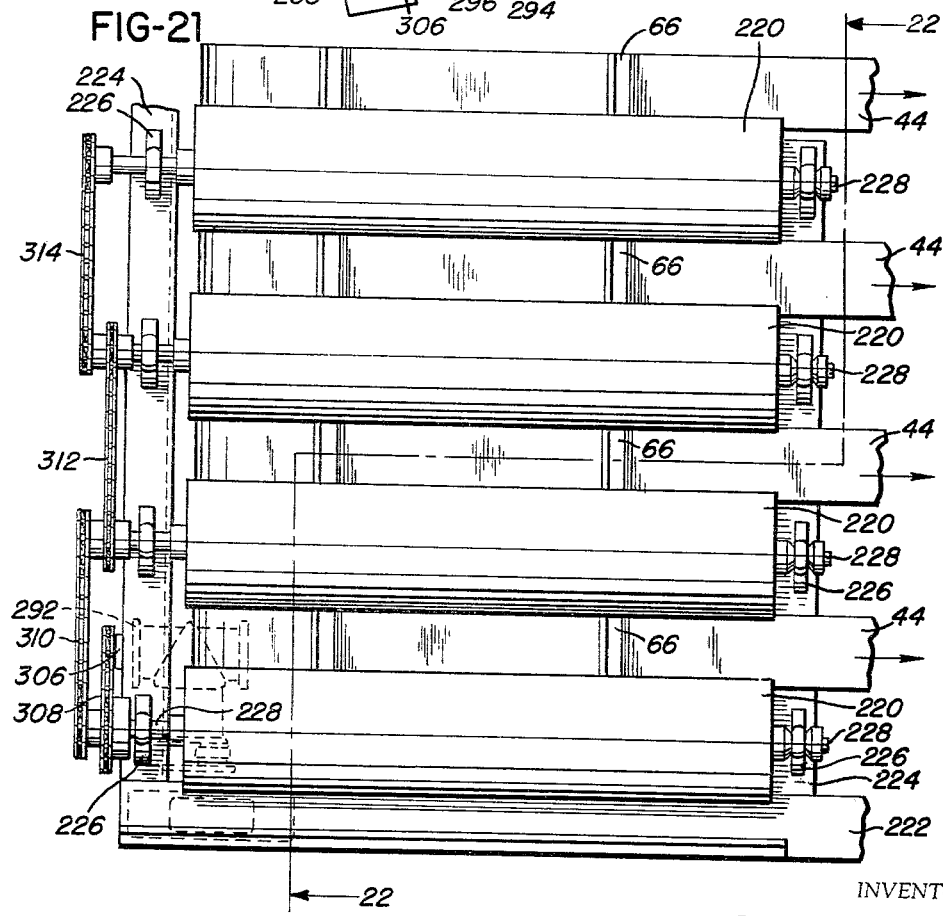
FIG. 21 is a plan view taken on line 21—21 of FIG. 20.

A second driving shaft 306 of gear box 292, may transmit motion through a chain drive 308, to one of the shafts 228 of an unscrambler roll 220, thereby to rotate such roll 220; and the remaining unscrambler rolls may be driven from that roll by means of chain drives 310, 312, and 314, as best shown by FIG. 21. The drive for rolls 220 should be such as to rotate them in a single direction, and at one speed.

It may here be noted that the accumulator 30 of FIG. 17 need not necessarily operate upon articles A to arrange them flatwise upon belt 34 prior to discharge. Accordingly, eccentric rollers 36 such as FIG. 16 discloses, may be usually eliminated from any accumulator when used in conjunction with a weighing conveyor and rotary unscrambler arranged as suggested by FIGS. 16 and 17.

In practice, it will be found advisable to operate the unscrambler belts at a much higher linear speed than that of the accumulator conveyor, perhaps three to five times faster. The speed of collecting conveyor 48 will of course be coordinated with the rate of delivery of articles by the several launchers 46, preferably with a slight excess delivered upon the collecting conveyor, for removal by kicker or rake 90. The excess of articles at this location practically assures complete charging of conveyor 48 with articles.

The belt speed of the oblique article deflectors 104, may approximate the speed of the collecting conveyor 48, with allowance made for the angularity factor involved. In any event, the article dislodging lugs of the deflectors require coordination with the rate of advancement of grooves 82, so that each deflector will remove from the collecting conveyor alternate ones of the articles advanced thereby, as previously explained. The speed of skew conveyors 106 may correspond more or less with the speed of delivery of collecting conveyor 48, but more importantly, the speed of terminal conveyor 100 should be coordinated with the skew conveyor rate of delivery in order to assure the required grouping of articles between the sets of lugs 118 on the terminal conveyor.

It should be understood that in some instances where chains and sprockets have been specified herein, belts and pulleys might readily be substituted therefor without impairment of function; and in those instances the invention is not to be limited to the employment of the expedient specified. Moreover, various other modifications and changes may be made in the structural details of the device, within the scope of the appended claims, without departing from the spirit of the invention.

We claim:

1. A device for organizing similar elongate articles initially piled in random disorder, comprising a box-like accumulator for containing the pile of disordered articles, means associated with the accumulator to deliver a substantially steady flow of articles from the pile as individuals, an unscrambler receptive of the delivery, including means to arrange the delivered individual articles in axial alignment, and to project said aligned articles as a substantially steady stream, a collecting conveyor in operative relationship with said projecting means moving transversely to the projected stream, means associated with said conveyor to arrange the projected articles thereon in a row, with the articles parallel to one another, and means operatively associated with said conveyor for dislodging articles from the row and arranging same in groups preparatory to packaging.

2. The device as set forth in claim 1, wherein the dislodging means includes means to arrange the articles in layers one upon another.

3. A device for organizing similar elongate articles initially piled in random disorder, comprising a box-like accumulator for containing the pile of disordered articles, means associated with the accumulator to deliver a substantially steady flow of articles from the pile as individuals, an unscrambler receptive of the delivery, including means to arrange the delivered individual articles in axial alignment and to project said aligned articles as a substantially steady stream, a collecting conveyor moving transversely to the projected stream of articles, means associated with said conveyor to arrange the projected articles thereon in a single row, with the articles parallel to one another, and means including a plurality of skew conveyors, for dislodging articles from the row and arranging said articles in a plurality of other rows remote from the collecting conveyor, said other rows being constituted of groups each containing a predetermined number of articles.

4. The device as set forth in claim 3, wherein the means last mentioned includes means for establishing a plurality of layers of articles in each group.

5. A device for organizing similar elongate articles initially piled in random disorder, comprising an accumulator for containing the pile of disordered articles, means associated with the accumulator to deliver a substantially steady flow of articles from the pile as individuals, an unscrambler receptive of said delivery, including means to arrange the delivered individual articles in axial alignment, and to project said aligned articles as a substantially steady stream from the unscrambler, a collecting conveyor including a belt movable continuously transversely of the projected stream of aligned articles, said belt including a succession of transverse grooves each dimensioned to receive one article projected from the unscrambler, spreader means overlying a portion of the length of the belt, to contact and spread the articles upon the belt and thereby urge the articles individually into the belt grooves, and means located beyond said spreader means for kicking from the belt any excess articles remaining after all the grooves are filled with articles.

6. The device as set forth in claim 5, wherein the combination includes means for returning to the accumulator the excess articles kicked from the collecting conveyor belt.

7. A device for organizing similar elongate articles initially piled in random disorder, comprising an accumulator containing the pile of disordered articles, means associated with the accumulator to deliver a substantially steady flow of articles from the pile as individuals, an unscrambler receptive of said delivery, including means to arrange the delivered individual articles in axial alignment, and to project said aligned articles as a substantially steady stream from the unscrambler, a collecting conveyor movable continuously and transversely of the projected stream of articles, means associated with said conveyor to arrange the projected articles thereon in a single row, with the articles parallel to one another, and deflector means for dislodging the articles from the collecting conveyor, said deflector means comprising a plurality of moving belts each having a lower reach extended obliquely across the collecting conveyor, a plurality of extending lugs on each of said deflector belts depending therefrom toward the collecting conveyor, to strike corresponding ends of the parallel articles and move said articles lengthwise and in parallelism with one another off one side of the collecting conveyor, the lugs of each deflector belt being so spaced from one another and advanced at such speed, that successive deflector belts dislodge articles from the collecting conveyor in the order of the number of deflector belts employed.

8. The device as set forth in claim 7, wherein the combination includes a plurality of skew conveyors equal in number to the number of deflector belts, each skew conveyor including movable upper and lower conveyor elements spaced apart to grip and advance articles fed thereto by a deflector means, in the same path of advancement established by the deflector means, and maintaining the parallel relationship of the articles as dislodged from the collecting conveyor by the deflector means, and means to group the articles as discharged by the skew conveyor, for acceptance by a packaging machine.

9. A device for organizing similar elongate articles initially piled in random disorder, comprising an accumulator containing the pile of disordered articles, means associated with the accumulator to deliver a substantially steady flow of articles from the pile as individuals, an unscrambler receptive of said delivery, including means to arrange the delivered individual articles in axial alignment, and to project said aligned articles as a substantially steady stream from the unscrambler, a collecting conveyor movable continuously and transversely of the projected stream of articles, means associated with said conveyor to arrange the projected articles thereon in a single row, with the articles parallel to one another, a first and a second deflector means for dislodging the articles from the collecting conveyor, said deflector means each comprising a moving belt having a lower reach extended obliquely across the collecting conveyor, a plurality of extending lugs on each of said deflector belts depending therefrom toward the collecting conveyor, to strike corresponding ends of the parallel articles and move said articles bodily lengthwise and in parallelism with one another off one side of the collecting conveyor, the lugs of each deflector belt being so spaced from one another and advanced at such speed, that the lugs of the first deflector belt dislodge alternate articles advanced by the collecting conveyor, and the lugs of the second deflector belt dislodge the remaining articles advanced past the first deflector means by said collecting conveyor, and means associated with each deflector belt for receiving articles therefrom and discharging said articles in separate paths upon an input conveyor of a packaging machine.

10. The devices as set forth in claim 9, wherein the means last mentioned comprises two skew conveyors, each receiving articles from a deflector belt, and conveying said articles disposed in parallel relationship along a path oblique to the direction of advancement of the collecting conveyor, and the input conveyor is disposed in parallelism with but alongside the collecting conveyor.

11. A device for aligning similar elongate articles initially piled in random disorder, comprising an accumulator for containing the pile of disordered articles, means associated with the accumulator to deliver a substantially unbroken flow of articles from the pile as individuals in a single layer, a series of vibratory bins beneath the accumulator to receive by gravitation the articles delivered by the accumulator, said bins each having convergent side walls and an elongate open bottom between said walls, the elongate bottom opening being of uniform width and slightly wider than the diameter of the articles, whereby the articles may pass therethrough as the walls orient the articles to alignment with the opening, a series of conveyors arranged closely beneath the bottom openings to receive articles passing therethrough, means moving said conveyors continuously in one direction lengthwise of the openings, said conveyors being each of a different length to release articles at different distances from the bins the difference in length of the conveyors being progressive, and along a line oblique to the direction of advancement of the conveyors, a launcher at the terminal end of each conveyor for receiving articles therefrom and projecting said articles away from the terminal ends of the conveyors, and a constantly advancing collecting conveyor movable in a direction approximately counter to the direction of advancement of the aforesaid series of conveyors, for receiving articles projected by the launchers.

12. A device for arranging similar elongate articles initially piled in random disorder, comprising an elongate box-like structure having a hopper end in which the articles are piled in disorder, and an opposite open discharge end, a bottom for the box-like structure comprising an endless conveyor substantially coextensive with said structure and supporting the pile of articles at the hopper end, means driving the conveyor in a direction for advancing the articles toward the discharge end of the structure, and a plurality of rotary kick-back rollers spaced apart and extending transversely of the conveyor at different distances from the discharge end, said rollers each having an axis of rotation eccentric to the periphery thereof whereby the roller peripheries assume different clearances from the conveyor as the rollers rotate upon their eccentric axes, the roller closest to the discharge end of the structure having a minimum clearance with the conveyor approximating the thickness of an article advanced upon the conveyor, and the peripheries of the remaining rollers having progressively greater minimal clearances with the conveyor in the direction of the hopper end of the box-like structure, and means for rotating said rollers in a direction such that the peripheral surfaces thereof adjacent to the conveyor move counter to the direction of advancement of the conveyor.

13. The device as set forth in claim 12, wherein the box-like structure is inclined for discharge of articles at an elevation above the hopper end.

14. A method of orienting a multitude of similar elongate articles for packaging, said method comprising: piling the articles into a hopper in random disorder; reducing the pile of articles to approximate single layer formation by conveying articles gradually from the pile; discharging the still disarrayed but separated articles through an elongate opening while keeping the articles in motion, and dropping same onto a subjacent belt moving continuously in parallelism with said opening for advancing the articles from the opening in en-to-end axial alignment; launching the aligned articles from said belt end-wise onto a transverse moving collecting conveyor having transverse grooves receptive of the articles individually; deflecting alternate articles from the collecting conveyor, while deflecting the remaining alternate articles therefrom, along two paths which are oblique to the direction of movement of the collecting conveyor, with all the deflected articles retaining the parallel relationship imposed by the grooves of the collecting conveyor; and then depositing upon a packaging machine input conveyor in single-layer groups, the articles of the two parallel rows of articles discharged from the two oblique paths aforesaid, with the articles of each group in parallelism and in side-by-side contact.

15. The method as set forth in claim 14, wherein a second layer of articles is superposed upon the single-layer groups of the input conveyor.

16. A method of orienting a multitude of similar elongate articles for packaging, said method comprising: piling the articles into a hopper in random disorder; reducing the pile of articles to approximate single layer formation; aligning the articles of the layer in end-to-end axial alignment and then in side-by-side formation in a single row of indeterminate length; then deflecting selected ones of the articles from the single row along two paths which are oblique to the direction of extension of the row, while maintaining the parallel relationship of the articles to one another; and then depositing upon a packaging machine input conveyor in groups the articles discharged from the two oblique paths aforesaid.

17. A method of orienting a multitude of similar elongate articles for packaging, said method comprising: piling the articles into a hopper in random disorder; reducing the pile of articles to approximate single layer formation by conveying articles gradually from the pile; dropping the still disarrayed but separated articles through an elongate opening while keeping the articles in motion, and dropping same onto a subjacent belt moving continuously in parallelism with said opening for advancing the articles from the opening in end-to-end axial alignment; launching the aligned articles from said belt endwise onto a transverse moving collecting conveyor having transverse grooves receptive of the articles individually; deflecting every fourth article at four different locations along the collecting conveyor in two paths, which paths are parallel to one another but oblique to the direction of movement of the collecting conveyor, with all the deflected articles retaining the parallel relationship imposed by the grooves of the collecting conveyor; and then depositing upon a packaging machine input conveyor in double-layer groups, the articles of the two parallel rows of articles discharged from the two oblique paths aforesaid, with the articles of each group in parallelism and the layers in contact.

18. The method as set forth in claim 17, wherein the articles as dropped through the elongate opening aforesaid are given axial rotational motion during passage onto the subjacent moving belt.

19. A method of orienting a multitude of similar elongate articles for packaging, said method comprising: piling the articles into a hopper in random disorder; reducing the pile of articles to approximate single layer formation by conveying articles gradually from the pile; dropping the still disarrayed but separated articles through an elongate opening and onto a continuously moving belt beneath said opening, for advancing the articles from the opening in end-to-end axial alignment; launching the articles from said belt endwise onto a transverse moving collecting conveyor having transverse grooves receptive of the articles; spreading the articles sidewise along the collecting conveyor while said conveyor is in motion, to fill the grooves with articles nested therein in side-by-side spaced parallelism; plucking from said collecting conveyor any excess articles lying atop the nested articles; deflecting alternate articles from the collecting conveyor, while deflecting the remaining alternate articles therefrom, along two paths which are oblique to the direction of movement of the collecting conveyor, with all the deflected articles retaining the parallel relationship imposed by the grooves of the collecting conveyor; and then depositing upon a packaging machine input conveyor in groups, the articles of the two parallel rows of articles discharged from the two oblique paths aforesaid, with the articles of each group in parallelism and in side-by-side contact.

20. A method of orienting a multitude of similar elongate articles for packaging, said method comprising: dropping said articles onto a continuously moving belt for advancing the articles in end-to-end axial alignment; launching the aligned articles from said belt endwise onto a transverse moving collecting conveyor having transverse grooves receptive of the articles individually, deflecting longitudinally spaced ones of said articles in predetermined sequence from the collection conveyor along parallel paths which are oblique to the direction of movement of the collecting conveyor, with all of the deflected articles retaining the parallel relationship imposed by the grooves of the collecting conveyor; and then depositing upon a packaging machine input conveyor in groups the articles of the two parallel paths of articles discharged from the two oblique paths aforesaid with the articles in parallelism and in side-by-side contact.

21. Apparauts for organizing similar rod-shaped articles initially piled in random disorder, comprising a box-like accumulator for containing rod-shaped articles disposed in a pile in random fashion therein, means cooperative with the accumulator to deliver a substantially steady flow of such articles from the pile as individuals, an unscrambler mechanism receptive of said delivery, including means to orient the delivered individual articles into axial alignment, and to move the aligned articles longitudinally, and successively freely project said aligned articles longitudinally endwise as a substantially steady stream from the unscrambler, a collecting conveyor moving transversely of the said stream of endwise projected articles, and means carried by said collecting conveyor to receive the longitudinally projected articles individually thereon, arranged in a row and lying transversely of the direction of movement of the conveyor with the articles substantially parallel to one another.

22. The invention according to claim 21, wherein the first stated means comprises an endless conveyor having a discharge end and supporting the pile of articles in the accumulator, with a plurality of kick-back rollers spaced apart and extending transversely of the conveyor at different distances from the discharge end, the roller closest to said discharge end having a periphery spaced from the conveyor a distance approximating the thickness of an article advanced upon the conveyor, the peripheries of the remaining rollers being spaced from the conveyor at progressively greater clearances therefrom, and means for rotating said rollers in a direction at which the surface thereof adjacent to the conveyor moves counter to the direction of advancement of the conveyor.

23. The invention according to claim 21, wherein the said means to orient the delivered individual articles comprises a plurality of elongate, juxtaposed, substantially parallel spaced apart members upon which the individual articles from the accumulator may drop, the spaces between the members exceeding the diameter of the articles fed thereto, a plurality of conveyor belts movable longitudinally of and beneath the spaces between the members, and in a direction lengthwise of the members, for removing articles that have passed between the members, and means for moving said members in a direction to effect alignment of the articles with said spaces and the underlying conveyor belts.

24. The invention according to claim 23, wherein is included, means operative in correspondency to the weight of articles fed to the unscrambler mechanism for varying the output rate of the accumulator.

25. The invention according to claim 23, with a weighing conveyor intermediate the accumulator and the unscrambler, in position to receive the articles delivered by the accumulator prior to passage of the articles to the unscrambler members, said weighing conveyor including means to vary the rate of discharge of the accumulator in response to changes in collective weight of the articles delivered by the accumulator.

26. The invention according to claim 21, wherein the said means to orient the delivered individual articles comprises a plurality of elongate, juxtaposed, substantially parallel spaced apart rolls upon which the individual articles from the accumulator may drop, the space between the rolls exceeding the diameter of the articles fed thereto, a plurality of conveyor belts movable longitudinally of and beneath the spaces between the rolls, and in a direction lengthwise of the roll axes, for removing articles that have passed between the rolls, and means for rotating said rolls in a common direction of rotation to effect aligning the articles with said spaces and the underlying conveyor belts.

27. The invention according to claim 25 wherein is included a variable speed electric motor connected in driving relationship with the conveyor of the accumulator, an electric circuit including said motor, and a variable potentiometer connected in the motor circuit to vary the speed of said motor and consequently the article delivery rate of said conveyor, said potentiometer being actuated by the weighing conveyor to reduce the speed of the motor as weight on the weighing conveyor increases, and to increase the speed of the motor as weight upon the weighing conveyor decreases, thereby to regulate the output of the accumulator.

28. The invention according to claim 21, with a series of conveyors adjacent to the collecting conveyor, movable in the same common direction, and in a common plane, for translating the oriented articles, the conveyors of the series being all of different lengths successively, for releasing the articles at different distances from the article orienting means.

29. The invention according to claim 21, wherein the box-like accumulator has a hopper end in which said pile of articles is contained, and an opposite open discharge end, and said means to deliver a substantially steady flow of articles in an endless conveyor forming a bottom for the accumulator, means supporting the accumulator with the discharge end inclined relative to the hopper end, means driving the conveyor in a direction for advancing the articles toward the said discharge end, and at least one kick-back roller extending transversely of the conveyor near the discharge end of the structure, said roller having a periphery spaced from the conveyor a distance slightly greater than the thickness of an article, operative to kick back toward the hopper end all advancing articles excepting those resting flatly upon the conveyor, and means for rotating the roller in a direction at which the surface thereof adjacent to the conveyor moves counter to the direction of advancement of the conveyor.

30. The invention according to claim 29, wherein the roller includes a supporting shaft which is eccentric to the roller periphery, and means on the box-like structure for rotatably supporting said shaft.

31. The invention according to claim 21, with means overlying the collecting conveyor for deflecting said articles laterally therefrom, and skew conveyor means cooperative with said deflecting means for translating the articles deflected from the collecting conveyor, comprising an elongate frame having opposite end portions and an intermediate portion, an upper row of shaft bearings, and a lower row of shaft bearings on the frame, said rows being equally spaced apart with the axes of the bearings extending laterally from the frame and in parallelism with one another, and the bearings of the upper row being disposed each directly above the bearings of the lower row to provide pairs of bearings, a shaft supported by each bearing for rotation, with the shafts extending laterally of the frame in a common direction, the shaft of each upper bearing being paired with the shaft of each being directly below, lines of sprockets on the upper shafts, said lines being parallel to the frame, and lines of sprockets on the lower shafts disposed parallel to the frame, endless conveyor elements trained about the sprockets of each line of sprockets, in the upper and lower rows, the inner reaches of the conveyor elements of the upper and lower rows being spaced apart to grasp and translate the articles deflected from the collecting conveyor, the lines of conveyor elements closest to the frame being approximately as long as the frame, and the lines of conveyor elements farthest from the intermediate portion of the frame being progressively shorter, whereby the conveyor elements may be disposed obliquely to the path of advancement of the collecting conveyor for advancing articles from the collecting conveyor along a path which is angular to the path of advancement of the collecting conveyor, and means for rotating all the shafts of the upper row of the skew conveyor in a direction of rotation opposite to the direction of rotation of the shafts of the lower row.

32. The invention according to claim 21, with means for kicking excess articles from said collecting conveyor comprising a housing, a plurality of bearing means one above another on the housing, and a plurality of parallel elongate rotary shafts supported by said bearing means to extend laterally from the housing, means supporting the housing with the rotary shafts extending obliquely across the collecting conveyor, the lowermost shaft being spaced above the conveyor to intercept any excess articles resting atop a single layer of articles supported from the advancing conveyor, and means for unidirectionally rotating the shafts in a direction to kick back the excess articles in a direction generally counter to the direction of the conveyor advancement.

33. The invention according to claim 21, wherein the last-stated means comprises transverse grooves approximating in length the length of the articles, the grooves being respective of articles loaded onto the belt in the general direction of extension of the grooves, a succession of pendulous flat plates suspended above the belt transversely thereof, the plates having independent swinging movement in parallelism with the belt grooves, said plates each including a planar lower edge spaced slightly from the belt and adapted to contact and spread the articles over the belt and into the transverse grooves thereof, and means for deflecting from the belt any excess articles failing to enter a belt groove.

References Cited by the Examiner

UNITED STATES PATENTS

| | | | |
|---|---|---|---|
| 1,865,086 | 6/1932 | Cutler | 198—29 |
| 1,886,896 | 11/1932 | Nelson | 198—30 X |
| 2,662,665 | 12/1953 | Harper | 222—55 |
| 2,671,550 | 3/1954 | Schultz | 198—30 |
| 2,758,697 | 8/1956 | Schultz | 198—30 |
| 2,862,606 | 12/1958 | Schlichting | 198—165 |
| 2,907,447 | 10/1959 | Offutt | 198—165 |
| 2,920,355 | 1/1960 | Clark | 198—57 X |
| 2,982,445 | 5/1961 | Koble | 222—55 |
| 3,061,066 | 10/1962 | Casino | 198—35 X |
| 3,119,217 | 1/1964 | Brownlee | 53—55 X |

FOREIGN PATENTS

| | | |
|---|---|---|
| 255,425 | 1/1913 | Germany. |
| 543,180 | 1/1932 | Germany. |

EVON C. BLUNK, *Primary Examiner.*

EDWARD A. SROKA, *Examiner.*